United States Patent [19]

Fioriti et al.

[11] 4,103,040
[45] Jul. 25, 1978

[54] LOW CHOLESTEROL EGG PRODUCT AND PROCESS

[75] Inventors: Joseph A. Fioriti, Hastings-on-Hudson; Howard D. Stahl, Tarrytown; Rex J. Sims, Pleasantville, all of N.Y.; Clifford H. Spotholz, Montvale, N.J.

[73] Assignee: General Foods Corporation, White Plains, N.Y.

[21] Appl. No.: 307,309

[22] Filed: Nov. 16, 1972

Related U.S. Application Data

[62] Division of Ser. No. 888,608, Dec. 29, 1967, Pat. No. 3,717,474.

[51] Int. Cl.$^2$ .............................................. A23L 1/32
[52] U.S. Cl. .................................................. 426/614
[58] Field of Search ................ 426/190, 211, 429, 614

[56] References Cited

U.S. PATENT DOCUMENTS

| | | | |
|---|---|---|---|
| 1,630,756 | 5/1927 | Parsons | 426/148 |
| 3,547,658 | 12/1970 | Melnick | 426/120 |
| 3,563,765 | 2/1971 | Melnick | 426/211 |

*Primary Examiner*—Joseph M. Golian
*Attorney, Agent, or Firm*—Thaddius J. Carvis; Richard Kornutik; Thomas R. Savoie

[57] ABSTRACT

Wet egg yolk is combined with edible oil by high energy, high shear mixing. During mixing cholesterol is extracted from the yolk by the oil. Simultaneously the ratio of polyunsaturated fat to saturated fat in the yolk is increased. The wet yolk is separated from the oil and can be made a constituent of various egg products.

2 Claims, 2 Drawing Figures

SEALS
POUCH
YOLK
ALBUMEN

SEALS
POUCH
ALBUMEN
YOLK

LOW CHOLESTEROL EGG PRODUCT AND PROCESS

This is a division of application Ser. No. 888,608, filed Dec. 29, 1967, now U.S. Pat. No. 3,717,474.

BACKGROUND OF THE INVENTION

This invention relates to wet egg yolk and egg products. More particularly it relates to wet egg yolk and egg products which ae low in cholesterol and high in polyunsaturated fat content and it relates to processes for obtaining same.

Health experts and physicians generally agree today that an important contributing cause of heart and circulatory disease is the consumption of foods high in cholesterol and having a fat content the majority of which is saturated fat. Thus they place great value on foods which are low in cholesterol and which also preferably have a fat content balanced between the polyunsaturates and saturates.

Egg has always been recognized as one of the most nutritious and popular foods. Unfortunately egg yolk is very high in cholesterol content, comprising approximately 1.7% of the egg yolk weight. Furthermore about ⅓ of the yolk weight is fat. Fatty acid analysis shows that the fat content of an average yolk is 35.4% saturated fat (principally palmitic and stearic acids), 49.1% monounsaturated fat (oleic acid), and 15.5% polyunsaturated fat (linoleic acid). Thus the ratio of polyunsaturated fat to saturated fat, hereafter referred to as P/S ratio, is less than 1 to 2, an undesirable balance.

It would therefore be advantageous if egg products could be obtained retaining the beneficial content (e.g. protein) while reducing the potentially harmful cholesterol level and increasing the P/S ratio. It would further be desirable to do this while retaining the functionality, appearance and taste of natural eggs which would yield good texture upon being cooked thus avoiding dried egg products and the like.

No method until this invention is known to have been developed to produce wet egg yolk low in cholesterol. Throughout the description of this invention by wet egg yolk is meant yolk in which the natural water content has been substantially retained. Previously solvents for fats and oils such as diethyl ether, methylene chloride, ethyl acetate, hexane, benzene and the like have been used to extract the total fat content and thus the cholesterol, from wet or dried egg yolk. Because of the nature of the solvents the yolk when cooked has a poor taste and texture. If wet egg yolk is used it must be dried to remove the residual solvent. In either case the end product is dehydrated egg yolk. Other low-cholesterol egg products are either partially synthetic or contain no egg yolk at all.

SUMMARY OF THE INVENTION

It is therefore an object of this invention to produce wet egg yolks and egg products therefrom which are substantially lower in cholesterol than normal egg. It is a further object of the invention to produce wet egg yolk and egg products therefrom which have a P/S ratio of 1 or greater, i.e., the polyunsaturated fat content is equal to or greater than the saturated fat content. In achieving the above objects, it is an overall object of this invention to obtain egg products having the functionality of natural eggs.

Generally, our invention accomplishes these and other results by combining wet egg yolks with an edible oil preferably high in polyunsaturated fats using a high energy, high shear mixer.

During the mixing, the cholesterol is extracted from the yolk into the oil. Simultaneously, the polyunsaturated fat content of the yolk is increased, raising the P/S ratio, if polyunsaturated oil is used. The yolk is then separated gravitationally from the oil and thus recovered. The yolk is still wet, having its water content intact.

This invention makes use of the known fact that cholesterol is soluble in fats and oils. However, this does not necessarily predict success in using oil to extract cholesterol from egg yolk, since, while we are not completely certain, we believe that a water barrier exists within the yolk which surrounds the yolk fat globules which would prohibit contact between those globules and the solvent oil droplets. If this is correct, we conclude that this barrier would have to be broken down to achieve substantial removal of cholesterol from the yolk. This would require a mixing device which could impart the needed energy to disrupt the yolk particles and thus hopefully the water barrier, and obtain intimate contact between the yolk fat globules and the solvent oil droplets.

Initially therefore a Waring Blendor, a kitchen type liquid blender which can supply a vigorous shearing action by high speed rotation of its blades, was used with considerable success as shown in some of the examples below. Other mixers also mentioned below can be used to achieve substantial extraction of the yolk cholesterol.

DESCRIPTION OF THE PREFERRED EMBODIMENT

Figure 1:
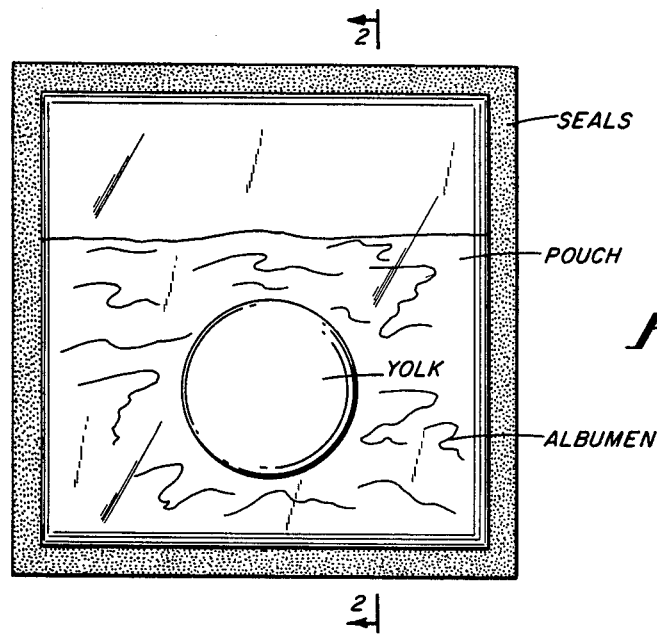
FIG. 1 is a front view of one of the various novel egg products that can be obtained from this invention, as described later.

In practicing this invention in a preferred manner, wet egg yolk is placed in a high shear mixer capable of imparting the needed energy to disrupt the aforesaid water barrier in the yolk, with an amount of an edible oil sufficient to keep the yolk in a free flowing state within the oil. The material is mixed at high energy for a time short enough to keep the rising temperature of the mixture from cooking the egg yolk. After blending, the oil yolk mixture is placed in a centrifugal separator to recover the wet yolk. Oil and egg yolk analyses show that at least half the cholesterol is removed from the yolk. When the edible oil is polyunsaturated, the P/S ratio increases from less than one half to at least one.

The process of this invention thus produces a wet egg yolk with the majority of its cholesterol removed, and when polyunsaturated oil is used as a solvent oil the P/S ratio shows a greater amount of polyunsaturates than saturates.

EXAMPLE I

The yolks of 2 eggs averaging 20.8 grams in weight and 283 mg of cholesterol, were placed in a Waring Blendor with 180 ml of safflower oil. The mixture was blended at high speed for five minutes, the temperatue of the mixture increasing from room temperature to 131° F. After blending, the oil yolk mixture was placed in a batch type centrifuge at 1000 RCF × g for 30 minutes to separate the yolk from the oil. Oil and egg yolk analysis by gas liquid chromatography showed that 221 mg of the cholesterol in each yolk had been extracted, or in other words 78% extraction had been achieved. Furthermore, fatty acid analysis disclosed that, per yolk, the fat content comprised 21.8% saturated fats, 15.4% monounsaturated fats and 62.8% polyunsaturated fat. The P/S ratio thus increased from less than one half to 2.85.

The recovered yolks were then cooled to 35° F. and molded into yolk like shapes. They were recombined with liquid egg white and the composite was cooked. A fried egg, acceptable in appearance taste and texture resulted.

EXAMPLE II

The yolks of two eggs averaging 18.2 grams in weight and 245 mg initial cholesterol content were blended with 180 ml of corn oil in the Waring Blendor, and separated and recovered as before. Analysis indicated that an average of 103.6 mg of cholesterol remained in each yolk after extraction, or 57.9% had been removed. The fat content of the yolk after extraction comprised 28% saturated fats and 40.7% polyunsaturated fats, giving a P/S ratio of 1.45.

EXAMPLE III

The experiment of Example II was repeated using cottonseed oil and two yolks averaging 18.1 grams and 240 mg of cholesterol. Analysis showed 67.7 mg of cholesterol remained in the yolk after extraction for a 71.8% removal. The fat content per yolk comprised 30.6% saturated fat and 42.2% polyunsaturated fat, giving a P/S ratio of 1.38.

EXAMPLE IV

Four wet egg yolks averaging 16 grams in weight and 202 mg cholesterol content were placed in a container with 360 ml of safflower oil. The probe of a Model W 185 D Sonifier Cell Disruptor was immersed in this mixture and run at maximum output (150 watts) for five minutes. The well emulsified slurry was placed in a centrifuge to recover the yolk. Analysis indicated that 101.6 mg per yolk of the cholesterol had been extracted or 50.3%.

The process of this invention may be extended to obtain any amount of cholesterol extraction that is desired. Semi-continuous or continuous extraction may be used; for example, the yolk may be blended successively with batches of fresh oil with recovery being accomplished after each blend as before. In a single extraction, as the amount of cholesterol dissolved in the oil increases, the ability of the oil to extract cholesterol decreases. Using multiple extractions with fresh oil eliminates this problem.

EXAMPLE V

Two fresh egg yolks averaging 19.7 grams in weight and averaging 265 mg initial cholesterol content, were placed in a Waring Blendor with 180 ml of safflower oil and blended for five minutes at high speed. After blending, the yolk and oil were separated as before. The recovered yolk was placed in a fresh 180 ml amount of safflower oil and blended and separated. This step was repeated once more with new oil. Analysis of the oil after each extraction revealed that 142 mg or 53.6% of the cholesterol was removed the first time, 79.5 mg or 29.8% was removed the second time, and 43.4 mg, or 16.4% was removed during the final extraction. Egg yolk analysis showed that only a trace of cholesterol remained in the yolk after three extractions, for an almost 100% removal.

EXAMPLE VI 41 lbs (5.4 gallons) of safflower oil were placed in a 10 gallon jacketed kettle, equipped with a turbine type self-baffled mixer and heated to 125° F. with hot water. Ten pounds of wet egg yolk were added to the oil with mild agitation. The mixture was then blended at full speed (7000 rpm) for 15 minutes with the temperature being held between 125° and 135° F. The resulting mixture was separated in a de-sludging centrifuge to recover the yolk. The recovered yolk was then added to 5.4 gallons of fresh preheated safflower oil and blended for an additional 15 minutes at full speed. The yolk was again separated in the de-sludging centrifuge. The third extraction was performed with 5.4 gallons of fresh preheated safflower oil under the same conditions. The yolk was again separated and saved as the final product.

The initial cholesterol in the yolk totaled 0.15 lbs. After the first extraction analysis revealed that 0.069 lbs of the cholesterol had been removed, or in other words 46%. During the second extraction 0.037 lbs were removed. During the third extraction 0.02 lbs were removed. The total cholesterol removed for all three extractions equalled 0.126 lbs, or in other words 84.3% of the cholesterol had been extracted.

Safflower oil is the preferred solvent since it is by weight 77% polyunsaturated fat. However, for purposes of cholesterol extraction from egg yolk, any edible oil would suffice, since all these oils act as solvents for cholesterol. But the types of fats in edible oils can vary widely with each particular oil. To achieve a low cholesterol wet egg yolk with an increased P/S ratio, it is necessary to use an oil which, like safflower oil, is high in polyunsaturates. Thus, corn oil, soybean oil, cottonseed oil and sunflower seed oil or the like would be appropriate. The amount of oil needed per yolk isn't crucial so long as the amount used is great enough to support the blended yolk in a free flowing state within the oil. Best results in cholesterol extraction are obtained when the yolk is fresh and has not been frozen for storage. Freezing produces centers of coagulation in the yolk, thus reducing the shearing efficiency of the extraction process.

The amount of cholesterol extracted varies directly with the increase in temperature due to the high energy blending. When the temperature rises much above 149° F. although almost all the cholesterol can be extracted, cooking of the yolk commences which will result in a poor egg product upon reconstitution. When the blending time is kept to about five minutes, adequate temperature is maintained.

Gravitational separation by batch centrifuge is used for maximum separation of the oil and yolk after blending. On a larger scale, a continuous de-sludging centrifuge, such as a Model SAAOH-205 Westphalia Separator can be used.

It has been seen that other mixers beside Waring Blendor can be used. The sonic oscillator of example IV can be used to provide the shearing energy to break up the yolk particles and achieve sufficiently intimate contact with the oil molecules to produce cholesterol extraction. On a larger scale, high-shear mixers such as the Beloit-Jones Model C-020 Hi-Intensity Mixer, such as that used in example VI, the Eppenbach Homogenizer, and the Cowles Dissolver, a colloid mixer, can be used.

Figure 2:
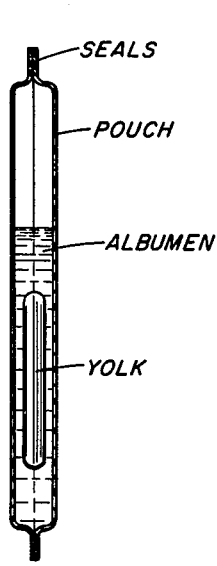
FIG. 2 is a side view of the same product.

The yolks obtained from this process can be made into a variety of egg products. They can be recombined with liquid egg white, packaged, and optionally, frozen. The contents of the frozen package when thawed and cooked, or when cooked from the frozen state, will result in an acceptable fried egg with a good taste and texture. This is the form illustrated in FIGS. 1 and 2.

When in the liquid state, the yolk and white may be scrambled while in the package by kneading the contents and an acceptable scrambled egg will result. Also the sealed package may be immersed in boiling water to produce a poached egg. Another advantage of this invention is that when a low cholesterol yolk is frozen and subsequently thawed, the functionality of the yolk is basically the same as it was before freezing. When natural egg yolk is frozen, gelation takes place, and when the yolk is thawed it is seen to have centers of coagulation and to possess a pasty jell-like texture. This does not result with the low cholesterol yolk of this invention.

Aside from the product just described and illustrated herein, a frozen egg roll has been proposed, comprising a cylindrical core of the low cholesterol egg yolk of this invention surrounded by a wider cylindrical shell of egg white, the whole being frozen. An egg product resembling the shape of a fried egg can be obtained by cutting off a cross sectional piece of the egg roll to be cooked as is.

When the egg yolk is to be used for baking purposes, it has been found that adding up to two grams of lecithin to the yolk after recovery as an emulsifier promotes better consistency in the baked product. It prevents falling apart of the baked goods and surface cracking which otherwise seems to occur. Lecithin need not be used when the yolk is for direct consumption.

The description herein of the process and products of this invention does not limit nor is it intended to limit the actual scope of our invention.

What is claimed is:

1. A process of producing a low cholesterol egg product which resembles the unmixed contents of a natural egg comprising:

cooling to a plastic condition the wet egg yolk of a product obtained from natural egg yolk and wherein the natural water content of the natural egg yolk is substantially retained and wherein the egg yolk has a ratio of polyunsaturated fat content to saturated fat content equal to or greater than 1, and a cholesterol content lower than that of natural egg yolk, and forming said yolk into a round shape, and combining the thus formed yolk with liquid egg white.

2. The egg product of the process of claim 1.

* * * * *